April 13, 1965 E. V. HARDEE 3,177,639
ROTARY MOWER WITH AN ALIGNED AND AN
OFFSET MAST-TYPE HITCH
Filed June 24, 1963 2 Sheets-Sheet 2

INVENTOR
ELDRED V. HARDEE

BY *George R. Douglas, Jr.*
ATTORNEY

United States Patent Office 3,177,639
Patented Apr. 13, 1965

3,177,639
ROTARY MOWER WITH AN ALIGNED AND AN OFFSET MAST-TYPE HITCH
Eldred V. Hardee, Rte. 4, Loris, S.C.
Filed June 24, 1963, Ser. No. 289,933
4 Claims. (Cl. 56—25.4)

The present invention relates to cutter apparatus, and more particularly to rotary cutter apparatus which is detachably connected to a tractor or similar type vehicles for towing or propulsion by said tractor. Specifically, the invention relates to cutter apparatus which may be alternately mounted on the rear of such tractor either in behind alignment or in off-center relation.

It is therefore an object of the present invention to provide a rotary cutter that can be easily and quickly connected to a tractor or the like so as to convert the tractor into a mower, crop cutter and the like, while the cutter is in either one of the positions.

It is another object of the present invention to provide a rotary cutter apparatus adapted to be mounted from a tractor in off-center relation that can be transported to different locations by attaching it to the back of a truck or vehicle in direct rear alignment and towing it to its place of use.

It is another object of the present invention to provide a rotary cutter apparatus that can be detachably connected to a tractor and pulled or towed directly behind the tractor or in alignment therewith so that the cutter will mow or cut a path through crops, foliage, brush and the like, directly in alignment with the path of travel of the tractor.

It is another object of the present invention to provide a rotary cutter apparatus for detachably connecting it behind a tractor or similar vehicle for towing or propulsion thereby along a path of travel behind the tractor that is out of alignment with the path of travel of the tractor or laterally offset therefrom.

It is another object of the present invention to provide a rotary cutter apparatus for detachable connection to a tractor or other propulsion vehicle for towing thereby with means for selectively connecting the cutter apparatus to the tractor so as to be pulled behind the tractor in straight alignment with the path of travel of the tractor at one time, and connected thereto at another time in a laterally offset position from the path of travel of the tractor.

It is another object of the present invention to provide a rotary cutter having shiftable pin means and gear means mounted thereon which are selectively connected to parts of a tractor so that the tractor can pull the rotary cutter in a straight behind combination or in an offset combination with the tractor.

It is another object of the present invention to provide a rotary cutter with single wheel means for detachable connection to a tractor for propulsion of the cutter by the tractor.

It is another object of the present invention to provide a rotary cutter with wheel means thereon that are adjustable in a vertical direction so that the rotary cutter can be positioned at a proper cutting height from the surface or ground when it is connected to the yoke means of a tractor which yoke means sometimes vary in their vertical distance from the surface or ground.

It is yet another object of the present invention to provide a rotary cutter apparatus provided with means for detachably connecting it to the pulling yokes of a tractor which means have a plurality of pin members for attaching the cutter to the tractor yokes so that it can be selectively operated to be towed in alignment with the tractor path of travel, or can be connected to be pulled behind the tractor in lateral offset relationship with the path of travel of the tractor.

Another object of the present invention is to provide a rotary cutter for use with or in combination with a propulsion vehicle such as a tractor having pairs of pin means thereon for attaching it to the yokes of a tractor in which the tractor yokes can be attached to one set of pin means for pulling the cutter in straight alignment with the path of travel of the tractor, and to other sets of pin means for atttaching the yokes of the tractor thereto for pulling the cutter in a path of travel behind the tractor which is laterally offset from the path of travel of the tractor.

Another object of the present invention is to provide a rotary cutter that can be detachably connected to the tractor for propelling it provided with attachment means and shiftable or displaceable reduction and drive gear means so that the cutter can be detachably connected to the tractor to be in a straight line position with he path of travel of the tractor, and can be laterally offset to one side of the tractor and behind the tractor to be pulled in a path of travel which does not coincide with the path of travel of the tractor, by merely selectively connecting the attachment means to the tractor yoke and selectively connecting the gear means to the drive means of the tractor in a first position provided on the cutter apparatus or in a second position provided on the cutter apparatus.

Another object of the present invention is to provide a rotary cutter having reduction and drive gear means thereon which are operatively connected to a power take-off means of a tractor for driving a rotary cutter blade member with fastening means for operatively connecting the gear means in one position when the rotary cutter is being pulled in a straight line position with the path of travel of the tractor, and for connecting the gear means in a second position when the rotary cutter is being pulled in a path of travel that is laterally offset or out of alignment with the path of travel of the tractor.

Another object of the present invention is to provide a rotary cutter for attachment to a tractor providing a cutter-tractor combination in which the cutter can be adjused vertically with respect to the ground or surface over which it is pulled, and in which the cutter can be adjusted laterally with respect to the tractor so it may be pulled in alignment with the path of travel of the tractor or alternatively, it may be pulled along a path of travel that is laterally offset or out of alignment with the path of travel of the tractor.

Various other objects and advantages of the present invention will be readily apparent from the following detailed description when considered in connection with the accompanying drawings forming a part thereof and in which.

Figure 1:
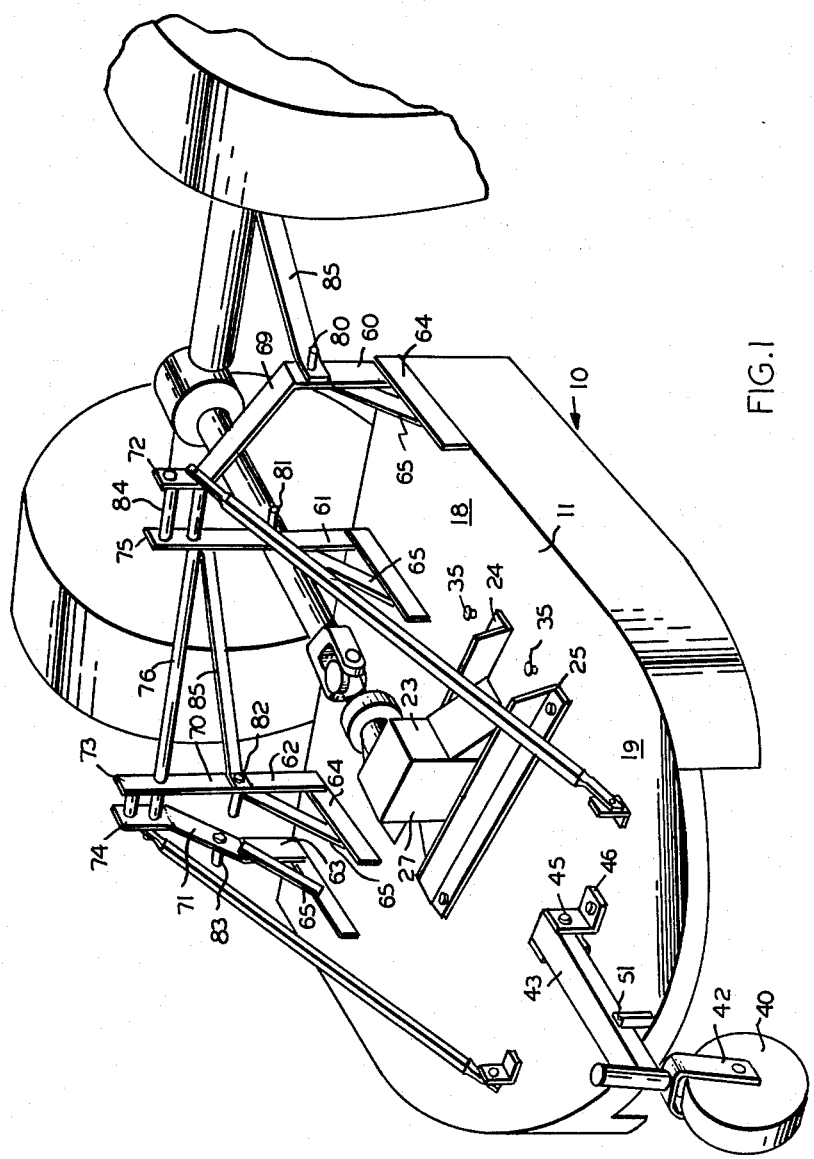
FIG. 1 is a perspective view of the cutter apparatus of a preferred embodiment of the present invention.
Figure 2:
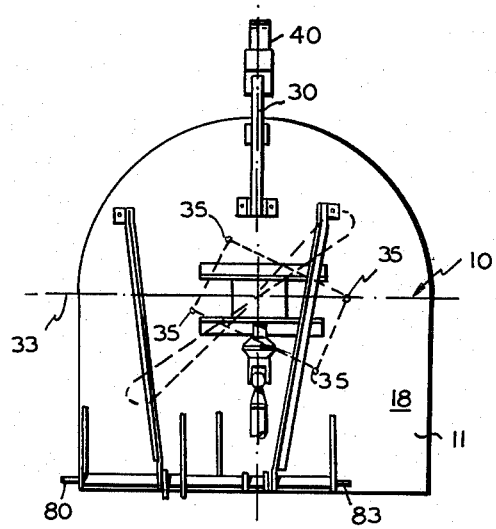
FIG. 2 is a front elevational view of the cutter embodied in the present invention, with certain portions omitted for purposes of clarity.

Referring to the drawings, there is shown a rotary cutter apparatus 10 which is provided with a chassis or casing 11 consisting of a horizontally extending top wall 12 with a downwardly depending vertical skirt 13 extending around the perimeter of the top wall 12 to provide a housing or chamber in which is disposed a rotary cutter blade 15. The skirt 13 extends completely around the sides and the rear portion of the casing 11, while the front end 16 of the casing is open as indicated in FIG. 2. The rear portion 17 of the skirt 13, as best shown in FIG. 2, is provided with an elongated horizontally extending opening 14 therein for permitting egress of material cut by the rotary blade 15 as the cutter is towed or pulled behind a tractor. The top wall 12 is substantially rectangular as indicated at 18 adjacent its front end, while the rear portion 19 of the top wall is semicircular.

Figure 3:
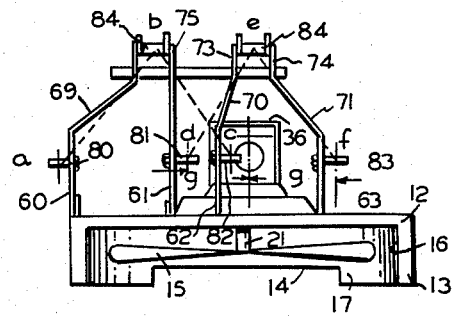
FIG. 3 is a top plan view of the cutter of the present invention.

The cutter blade 15 is of a conventional well-known type and is fixed to a vertical shaft 21 which extends through the top wall 12 of the casing and into a gear box housing 23 containing a gear reducer mechanism that is also well known, through which gear mechanism the blade is drivably connected to the tractor power take-off, as hereinafter described. The gear reduction mechanism housing is a substantially vertical, rectangularly shaped box having its lower end suitably secured by welding or the like to two spaced horizontal angle irons 24, 25 disposed adjacent the front and rear sides, 26 and 27 respectively, of the gear box housing, as best seen in FIG. 3. The angle irons 24, 25 are detachably secured to the top wall 12 so as to extend in a transverse direction thereacross, or at right angles with the longitudinal axis indicated as 30 of the cutter housing 11, by stud members 32 provided with nuts thereon. The stud members 32 are disposed on the top wall 12 so that they extend through openings in opposite ends of the angle irons 24, 25, and so that the midpoints of the angle irons coincide with the longitudinal axis 30 of the cutter apparatus, as is clearly shown in FIG. 3. The stud members 32 are positioned between the front portion 18 and the rear portion 19 of the casing 11 so they are equidistant from the diameter of the semicircular portion, which diameter is indicated at 33. The gear box housing 23 is disposed centrally of the angle irons 24, 25 so that its transverse and longitudinal axes coincide with the longitudinal axis 30 and the diameter 33 of the semicircular portion respectively, and so that the rotatable blade 15 shown in dotted lines in FIG. 3 can properly rotate within the interior of the casing 11 without coming into contact with the skirt 13 thereof.

Additional stud and nut members 35 are suitably secured to the top wall 12 of the casing, as best seen in FIG. 3, in a rectangular configuration thereon so that the angle irons 24, 25 and the gear box housing can be turned or angularly shifted to the position shown in dotted lines in FIG. 3, at an angle of approximately 45° with respect to the longitudinal axis 30 of the cutter apparatus, so that the gear box housing can be operatively connected to the tractor power take-off at an angle when the cutter is being pulled in a position that is offset with respect to the path of travel of the towing tractor. The upper end of the gear box housing 23 is provided with a handle 36 secured thereto for lifting the gear box to rotate or shift it to its angular position with respect to the cutter housing.

The front 26 of the gear box is provided with a coupling adapter member 37 and a connector shaft 38 which extends into the gear box and is connected to the input of the gear reduction mechanism by well-known means for driving the cutter shaft 21 connected to the output of the reducer mechanism by well-known means within the gear box.

A wheel 40 is provided at the rear of the cutter apparatus and has a vertical strut 41 connecting the wheel yoke 42 to a horizontal structural member 43 carried by the rear portion 19 of the casing. The structural member 43 is a box channel having its forward end 44 pivotally connected by pin means 45 to spaced ears or lugs 46 fixed on the top wall 12 of the casing. The structural member 43 is disposed on the casing so that its axis is in alignment with or coincides with the longitudinal axis 30 of the casing. The rear portion of the channel extends between two vertical members 49 secured to the casing. These angle iron members 49 are provided with a plurality of vertically spaced apertures 50 in alignment with one another so that a pin member 51 can be inserted through the aligned openings 50 and two aligned openings in the sides of member 43 to adjustably raise and lower the rear portion of the cutter housing or casing 11 with respect to the ground or surface over which it is to be pulled.

The attachment means for connecting the rotary cutter to the yokes of a tractor are provided with four vertical structural members or strap members 60, 61, 62 and 63. The members 60, 61, 62 and 63 are rectangular in cross-section and made of rigid metal material, and they have their lower edges bolted to longitudinal struts 64 welded to the top of the casing 10 adjacent the forward portion 18 thereof. These longitudinal struts 64 are disposed adjacent the forward edge of the casing and have diagonal braces 65 secured to their rear ends by pins or bolt members 66 with the upper end of the braces being secured by pins 67 to the lower portion of the structural members 60, 61, 62 and 63 to form a rigid structure therewith.

As best seen in FIG. 2, the structural member 60 extends vertically upwardly and thereafter is provided with diagonally inclined section 69 extending in a lateral direction, while structural member 61 is substantially straight. The structural member 62 is also provided with a diagonally inwardly inclined section 70 extending laterally of the casing, but inclined more steeply than the section 69 of structural member 60. The structural member 63 is also provided with a diagonally inwardly inclined section 71 which extends laterally of the casing but in a direction opposite to the inclination of sections 69 and 70 of the other structural members 60 and 62. The upper end of structural member 60 is provided with a substantially vertical portion 72 above the sloped section 69, while structural member 62 is provided with a substantially vertical upper end portion 73 above 70, and structural member 63 is provided with a substantially vertical end portion 74 above its sloped section 71. The vertical sections 72, 73 and 74 are disposed in lateral alignment with each other, and with the upper end 75 of the straight structural member 61.

Figure 4:
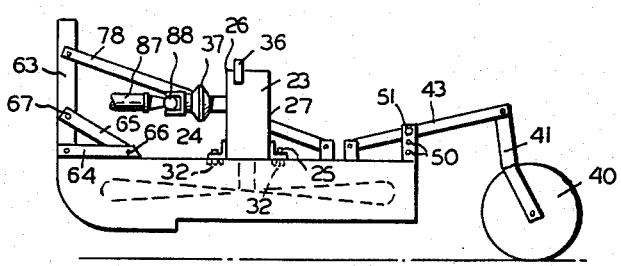
FIG. 4 is a side elevational view of the cutter apparatus connected to the yoke of a tractor.

An elongated bar or rod 76 extends through aligned openings in the end portions 72, 75, 73 and 74 of the structural members and is secured thereto by nuts disposed on the opposite ends of the bar. An upper diagonal brace member 78, as shown in FIGS. 3 and 4, is secured to the section 72 of the structural member 63 and the section 72 of the structural member 60 by pin or bolt means. The lower ends of the brace members 78 are secured by pin means to upstanding ears or lug members 79 secured to the rear portion of the casing 11 by welding or other suitable means to brace and support the structural members. Referring to FIG. 3, it will be noted that the rear or lower portions of the brace members 78 are spaced farther apart than the front or upper ends of the brace members 78 so as to provide sufficient space for the gear box mechanism housing 23 and the angle irons 24, 25 therebetween, without any interference therewith when the gear box and the angle irons are shifted from one position to another when it is desired to position the cutter in either an offset or a straight behind position in relation to the tractor.

The lower portions of the structural members are provided with elongated pin members 80, 81, 82 and 83. The pin members are detachably connected to the straight portion of the structural members by threaded nuts and are inserted into apertures in the structural members all of which apertures are in horizontal alignment with one another. The pin member 81 is connected to structural member 60 so that it extends outwardly and beyond the skirt 13 of the casing 11, as shown in FIG. 2, while the pin member 81 on the structural member 61 is connected thereto in a direction disposed opposite to the pin member 80 so that it extends in a direction toward the longitudinal and central axis of the cutter housing. The pin member 82 is connected to the strut 62 and extends in a direction toward the longitudinal axis of the cutter or in the same direction as the pin 81.

If desired, the pin 82 may be eliminated and the pin 81 may be transferred from the structural member 61 to the structural member 62 when it is desired to selectively connect the cutter to the tractor so as to operate it in a lateral offset position behind the path of travel of the tractor, as hereinafter described.

The pin member 83 is connected to the structural member 63 so as to face outwardly therefrom in a direction toward the periphery of the top wall 12 of the casing and away from the longitudinal or central axis of the cutter housing.

The structural members are positioned laterally of each other so that the space between the portions 72 and 75 and the space between the portions 73 and 74 are of the same dimension or equidistant, and conventional floating linkages indicated as 84 are carried by the structural members in these two spaces. The standard floating linkage enables the cutter when not in use to be towed by a truck or similar vehicle to a place of storage or a place of usage.

Referring to FIG. 2, there is illustrated therein two triangles in dotted lines. The dimensions of the triangle marked a, b and c should be identical with the dimensions of the triangle marked d, e and f. It is to be noted that the reference characters a, d, c and f indicate the midpoint or center point of that portion of the pin members upon which the tractor yokes are mounted, as hereinafter described.

Figure 5:
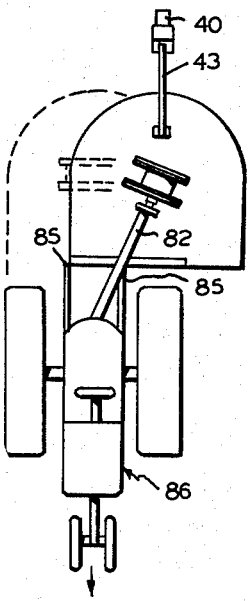
FIG. 5 is a generally diagrammatic view illustrating the cutter being towed by a tractor in a position in straight alignment with the path of travel of the tractor, and towed in a position which is laterally offset or out of alignment with the path of travel of the tractor.

When the cutter is to be selectively connected or attached to the tractor yokes 85 (see FIG. 5) of a tractor 86 so as to position the cutter in straight alignment with the path of travel of the tractor, as shown in dotted lines in FIG. 5, the tractor yokes are mounted or positioned on the pins 81, 83 which pins are disposed at this time as shown in FIG. 2. The pins 81, 83 are mounted on the casing 11, as shown in FIG. 2, so that they are spaced identical distances, indicated by g in FIG. 2, from the central or longitudinal axis of the cutter. Since the yokes are symmetrically attached or secured on opposite sides of the longitudinal axis of the tractor 86, the connection of the yokes to the pins 81, 83, when positioned as shown in FIG. 2, will cause the cutter to be in straight alignment with the path of travel of the tractor so that the cutter will mow or cut a swatch or path directly in alignment with the path of travel of the tractor. At this time, the gear box mechanism 23 and the angle irons 24, 25 are disposed in the transverse position shown in FIG. 3 so that the angle irons extend at right angles to the longitudinal axis 30 of the cutter.

The tractor drives the cutter blade by a conventional power take-off 87 disposed adjacent the rear of the tractor through a universal joint member 88 operatively connected to the coupler member 37.

When it is desired to pull or tow the cutter behind the tractor in a laterally offset position, or in a position which is out of alignment with the longitudinal axis and the path of travel of the tractor, it is only necessary to remove the yoke members 85 of the tractor from the pins 81, 83 and to mount them on the pins 80, 82, respectively, which pins are disposed as shown in FIG. 2 at this time. When this is accomplished, the cutter will be towed by the tractor in the position shown in full lines in FIG. 5, so as to cut a swath or path which is partially behind the path of travel of the tractor and partially to one side thereof, or beyond one side of the tractor rear wheel.

When the tractor is operated in this offset or out of alignment position with respect to the cutter, the bolt members 32 are disconnected from the angle irons 24, 25 by removing the nuts therefrom, and the handle 36 is utilized to shift or rotate the gear box mechanism housing and the angle irons from the transverse position shown in full lines in FIG. 3 to the angled position shown in dotted lines in FIG. 3. Thereafter, the angle irons are mounted on the stud members 35 and the nuts are securely tightened thereon.

Should the yoke members on a conventional tractor vary in their vertical distance or height from the ground, depending upon the type of tractor being used, and connection of the yoke members to the pin members of the cutter inclines or tilts the cutter housing at an angle with respect to a horizontal plane or the plane of the ground or surface, the horizontal position of the cutter may be readily adjusted by removing the pin member 51 from an aperture 50 of the member 49 on the rear of the casing of the cutter, and properly reinserting the pin 51 in the proper aperture that positions the cutter casing in a plane substantially parallel to the plane of the ground.

Thus, the present invention provides a rotary cutter apparatus with attaching means including pin means for selectively connecting it to the conventional yoke members of a tractor for positioning the cutter at one time in a straight behind position or in straight alignment with respect to the path of travel of the tractor, and to position the cutter in a lateral offset position with respect to the path of travel of the tractor at another time, which operation can be accomplished by merely removing the tractor yokes from the pin members of the cutter and mounting them on another set of pin members provided thereon, and shifting the blade drive transmitting means.

From the foregoing description, it is also apparent that the power take-off shaft normally associated with a tractor can still drive the cutter blade of the cutter through a reduction mechanism without any undue stress on the power drive or the reduction mechanism by merely disconnecting the reduction mechanism from one set of stud members on the cutter and rotating or turning it to a second position wherein the reduction mechanism housing is disposed at an angle with respect to the longitudinal axis of the cutter, and thereafter mounting it on a second set of stud members and rigidly securing or tightening the reduction mechanism to the cutter so it is now disposed in a proper position for cutting with the cutter disposed in a lateral offset position with respect to the tractor which is pulling it.

It will be readily understood that the present invention is not to be limited to the specific embodiment described inasmuch as various changes may be made in the form, location and relative location of the parts without departing from the essential characteristics of the invention, and hence the invention is not to be limited except as set forth in the appended claims.

What is claimed is:

1. A rotary cutter for attachment to a vehicle for propulsion thereby, comprising a housing with a rotatably mounted cutter blade therein, a plurality of laterally spaced vertical members disposed adjacent the front end of said housing, aperture means in said members in lateral alignment with each other, a horizontal pin carried in each aperture means for mounting yokes on the vehicle thereon, at least two of said pins being spaced laterally of each other the same distance from the central axis of said housing so that the cutter can be attached to the vehicle in alignment with the propulsion vehicle, and at least two other pins being spaced laterally of each other the same distance as said first-mentioned pins, said second-mentioned pins both being spaced adjacent the same side of the central axis of said housing so the cutter can be laterally offset from the propulsion vehicle, speed reduction means being carried on said housing in alignment with the central axis thereof and said reduction means being operatively connected to said cutter blade and adapted to be connected to the vehicle, and means being provided on said housing for selectively rotating said reduction means through an angle from one position to a second position on said housing, said reduction means being carried on spaced angle irons secured thereto, and two sets of spaced stud means selectively connecting said irons to said housing in said first and second positions.

2. In combination with a tractor and the like with spaced yokes extending from the rear thereof for attachment to a cutter to be pulled thereby, a cutter housing with a rotary blade carried therein, attachment means disposed on the front portion of said housing including at least three pin means for carrying said yokes thereon, said pin means being horizontally disposed in lateral alignment with each other, two of said pin means being disposed an equal distance on opposite sides of the central axis of said housing for attaching said cutter housing to said yokes in longitudinal alignment behind said tractor, and the third pin means being disposed adjacent one side edge of said housing, means for positioning one of said pin means disposed on the same side of the central axis as said third pin means into a position closer to the central axis of said housing and in lateral alignment with said third pin means, and spaced from said third pin means the same distance said two pin means are spaced apart on opposite sides of said central axis, for attaching said cutter housing to said yokes in longitudinal misalignment with said tractor, a speed reducer mechanism being carried on said housing on said central axis and operatively connected to said vehicle and said rotary blade to rotate said blade, and said mechanism is secured to two spaced angle irons, and two sets of stud means are secured to said housing with one set positioned to secure said angle irons transversely of said central axis, and another set to secure said angle irons at an acute angle with respect to said central axis.

3. The combination of claim 2 wherein said housing is provided with a single wheel means adjacent the rear of the housing and positioned in alignment with said central axis.

4. The combination of claim 2 wherein said wheel means is connected to said housing by an elongated channel member having one end pivotally connected to said housing, and vertically apertured upstanding lug members disposed on said housing rearwardly of said one end, and a transverse pin provided for insertion through apertured lug members and said elongated channel to adjust the vertical distance of said housing from the ground surface on which the vehicle is disposed.

References Cited by the Examiner

UNITED STATES PATENTS 2,926,479   3/60   Northcote et al. _____ 56—25.4
3,047,995   8/62   Chestnut _____ 56—25.4
3,068,630  12/62   Caldwell _____ 56—6

FOREIGN PATENTS 807,867   1/59   Great Britain.

T. GRAHAM CRAVER, *Primary Examiner.*
ANTONIO F. GUIDA, *Examiner.*